(12) United States Patent
Middelberg

(10) Patent No.: US 9,409,454 B2
(45) Date of Patent: Aug. 9, 2016

(54) SELF-INFLATING TIRE WITH HYBRID PUMP

(71) Applicant: The Goodyear Tire & Rubber Company, Akron, OH (US)

(72) Inventor: Jason Mark Middelberg, Napier (NZ)

(73) Assignee: The Goodyear Tire & Rubber Company, Akron, OH (US)

( * ) Notice: Subject to any disclaimer, the term of this patent is extended or adjusted under 35 U.S.C. 154(b) by 149 days.

(21) Appl. No.: 14/103,176

(22) Filed: Dec. 11, 2013

(65) Prior Publication Data

US 2015/0158352 A1 Jun. 11, 2015

(51) Int. Cl.
*B60C 23/12* (2006.01)

(52) U.S. Cl.
CPC ......... *B60C 23/12* (2013.01); *Y10T 152/10495* (2015.01)

(58) Field of Classification Search
CPC .............................. B60C 23/12; B60C 25/002
See application file for complete search history.

(56) References Cited

U.S. PATENT DOCUMENTS

| 2011/0146867 A1* | 6/2011 | Benedict | 152/426 |
| 2013/0112328 A1* | 5/2013 | Hinque et al. | 152/450 |
| 2014/0000778 A1* | 1/2014 | Gobinath | B60C 23/12 152/450 |

FOREIGN PATENT DOCUMENTS

| DE | 3433318 | 3/1986 |
| DE | 3433318 A1 | 3/1986 |
| EP | 2343200 A2 | 7/2011 |
| EP | 2746072 A1 | 6/2014 |

* cited by examiner

*Primary Examiner* — Jeffrey J Restifo
*Assistant Examiner* — Erez Gurari
(74) *Attorney, Agent, or Firm* — June E. Rickey

(57) ABSTRACT

A self-inflating tire assembly includes a first and second air tube mounted within a tire wherein each air tube defines an air passageway. Each air tube is composed of a flexible material operative to allow an air tube segment opposite a tire footprint to flatten, closing the passageway, and resiliently unflatten into an original configuration. Each air tube is sequentially flattened by the tire footprint in a direction opposite to a tire direction of rotation to pump air along the passageway to an outlet device for direction into the tire cavity. Each air tube has an inlet end that are joined together by an inlet device. Each air tube has an outlet end that are joined together by an outlet device The inlet device is preferably positioned 180 degrees opposite the outlet device. The inlet device allows air to transfer from one air tube to the other air tube. The outlet device allows air to transfer from one air tube to the tire cavity.

4 Claims, 8 Drawing Sheets

SELF-INFLATING TIRE WITH HYBRID PUMP

FIELD OF THE INVENTION

The invention relates generally to self-inflating tires and, more specifically, to a pump mechanism for such tires.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependent upon the driver taking remedial action when warned to re-inflate a tire to recommended pressure. It is a desirable, therefore, to incorporate a self-inflating feature within a tire that will self-inflate the tire in order to compensate for any reduction in tire pressure over time without the need for driver intervention.

One type of self inflating tire feature is a peristaltic pump assembly. If the pump is annular or 360 degrees in length, it will not be bidirectional unless there is additional valving. The use of 2 180 degree pumps allow the system to be bidrectional. This is because only one pump works when the tire rotates in one direction, and the other pump works when the tire rotates in the opposite direction.

Thus it is desired to have a simple pump design that is bidirectional and can pump 360 degrees without the need for complicated valving.

SUMMARY OF THE INVENTION

The invention provides in a first aspect a self-inflating tire assembly in a tire mounted to a rim, the tire having a tire cavity, first and second sidewalls extending respectively from first and second tire bead regions to a tire tread region; a first air tube mounted in the tire and defining an air passageway, the air tube being composed of a flexible material operative to allow a portion of the air tube segment near a tire footprint to close the annular passageway, the first air tube having an inlet and an outlet, a second air tube mounted in the tire and defining an air passageway, the air tube being composed of a flexible material operative to allow a portion of the air tube near a tire footprint to close the annular passageway, the second air tube having an inlet and an outlet, wherein the inlet of the first air tube is connected to the inlet of the second air tube by an inlet device; wherein the inlet device is in fluid communication with the outside air; wherein the inlet of the first air tube is in fluid communication with the inlet of the second air tube; wherein the outlet of the first air tube and the second air tube is in fluid communication with the tire cavity.

Definitions

"Aspect ratio" of the tire means the ratio of its section height (SH) to its section width (SW) multiplied by 100 percent for expression as a percentage. "Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

Figure 1:
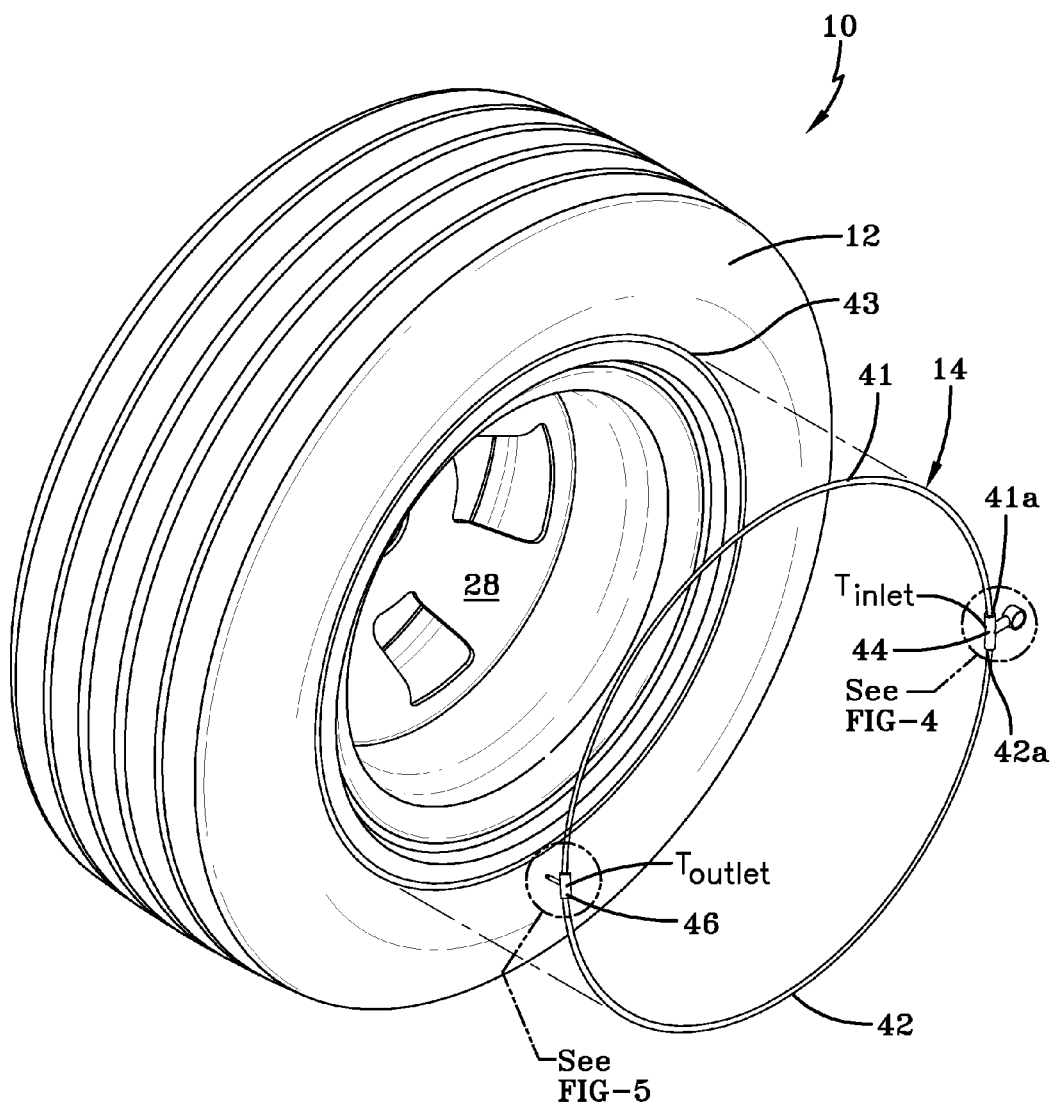
FIG. 1 is an exploded view of the hybrid pump mechanism and tire of the present invention.
Figure 9:
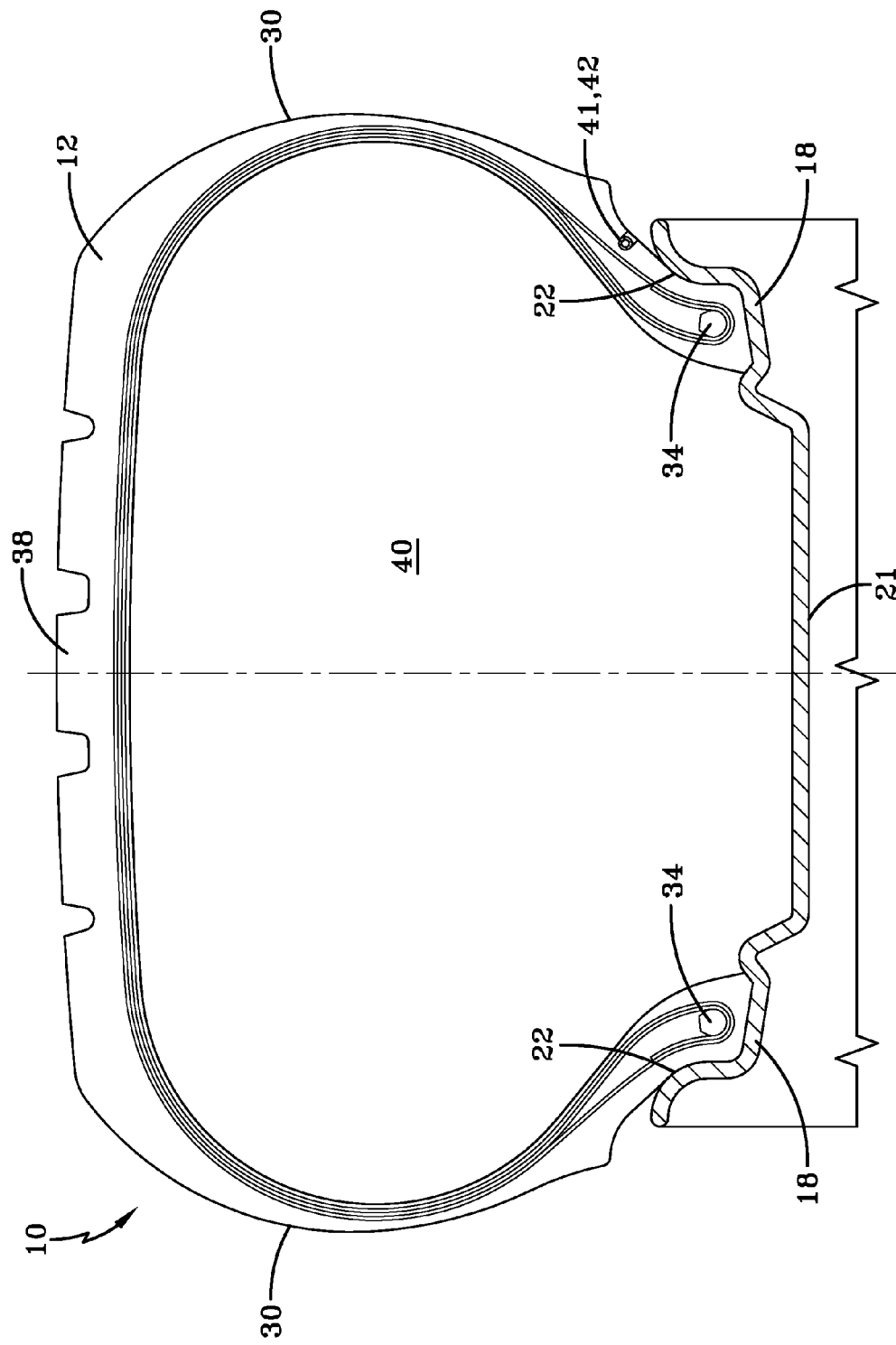
FIG. 9 is an enlarged cross sectional view of the tire and rim assembly with the pump system shown mounted in the tire.

Referring to FIG. 1, a tire assembly 10 includes a tire 12, a peristaltic pump assembly 14, and a tire rim 28. As shown in FIG. 9, the tire mounts in a conventional fashion to a pair of rim mounting surfaces 18 located adjacent outer rim flanges 22. The tire rim 28 includes an annular rim body 21 that joins the rim flanges 22 and supports the tire assembly as shown. The tire is of conventional construction, having a pair of sidewalls 30 extending from opposite bead areas 34 to a crown or tire tread region 38. The tire and rim enclose a tire cavity 40.

Figure 2:
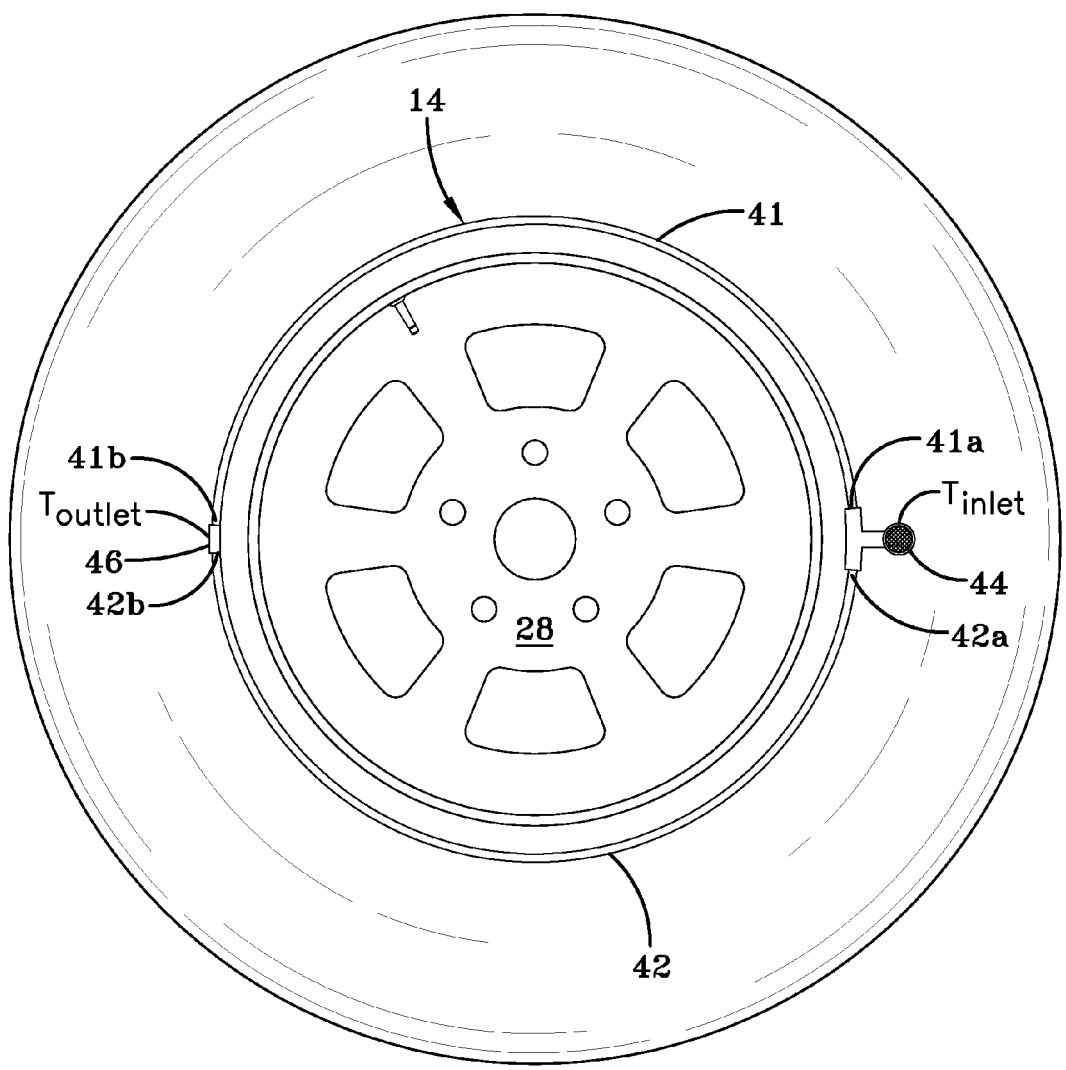
FIG. 2 is a front view of the hybrid pump and tire mechanism of FIG. 1.
Figure 3:
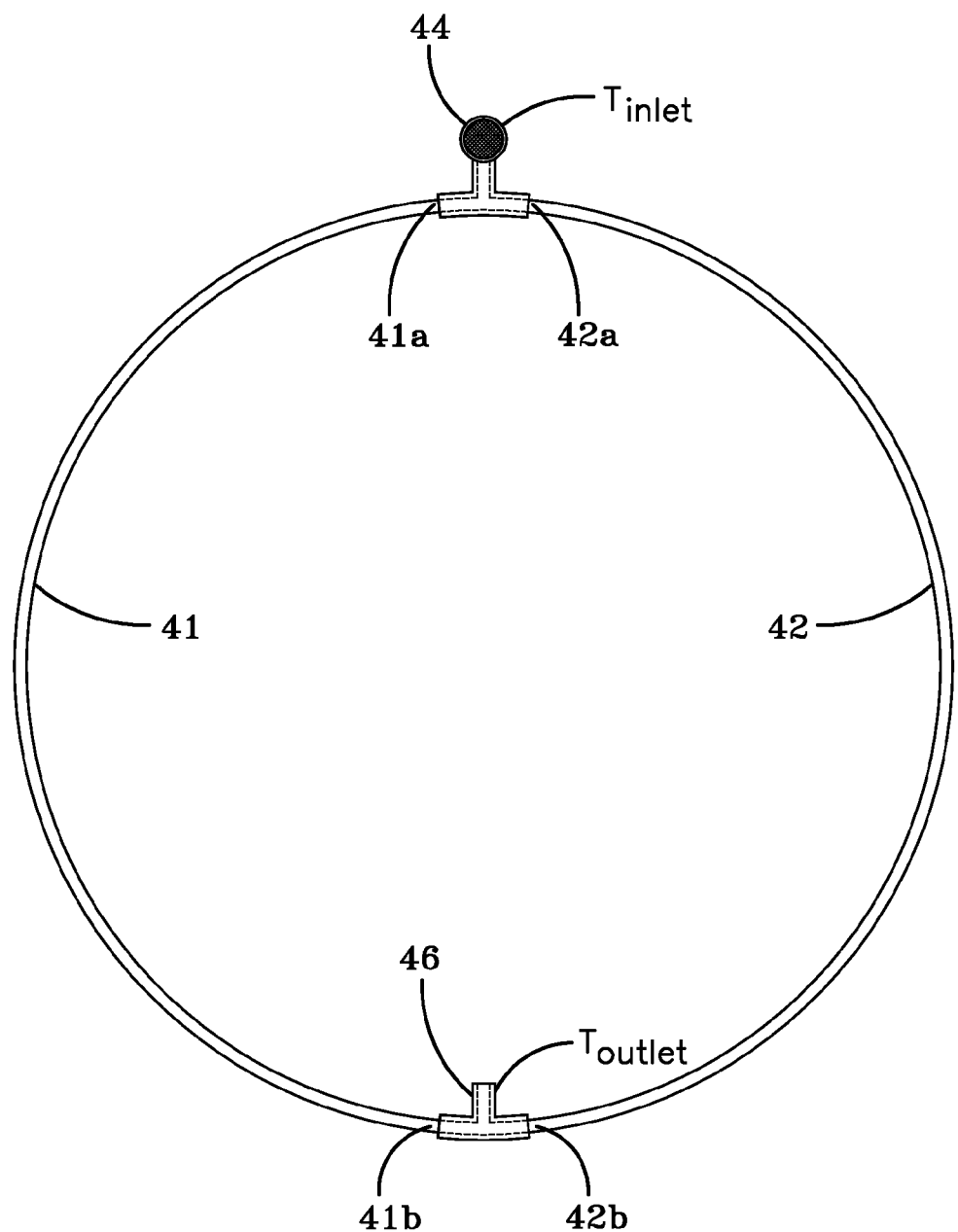
FIG. 3 is a front view of the hybrid pump assembly.

As shown in FIGS. 1-3, the peristaltic pump assembly 14 includes a first and second pump 41, 42 that are mounted in a passageway 43 located in the sidewall area of the tire, preferably near the bead region. The air passageway is preferably molded into the sidewall of the tire during vulcanization and is preferably annular in shape. Each pump 41, 42 has a first end 41a, 42a joined together by an inlet device 44 and a second end 41b, 42b joined together by an outlet device 46. Each pump 41, 42 is comprised of a tube formed of a resilient, flexible material such as plastic, elastomer or rubber compounds, and is capable of withstanding repeated deformation cycles when the tube is deformed into a flattened condition subject to external force and, upon removal of such force, returns to an original condition generally circular in cross-section. The tube is of a diameter sufficient to operatively pass a volume of air sufficient for the purposes described herein and allowing a positioning of the tube in an operable location within the tire assembly as will be described. Preferably, the tube has a circular cross-sectional shape, although other shapes such as elliptical may be utilized.

Figure 5:
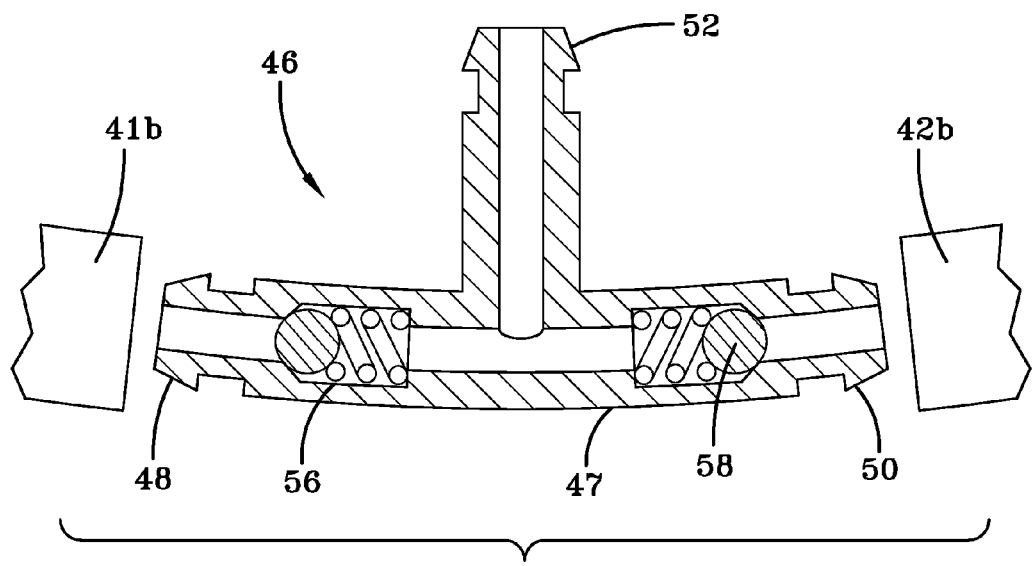
FIG. 5 is a front view of the hybrid pump outlet assembly.

As shown in FIG. 3, the inlet device 44 and the outlet device 46 are spaced apart approximately 180 degrees at respective locations. As shown in FIG. 5, the outlet device 46 is a T shaped connector having a body 47 having a first port 48 that connects to pump 41 outlet end 41b. The first port 48 is in fluid communication with outlet port 52. Outlet port 52 extends into the tire cavity so that the pump end 41b is in fluid communication with the tire cavity. The outlet device further includes a second port 50 that connects to pump 42 outlet end 42b. The second port 50 is also connected to outlet port 52, so that the pump end 42 is in fluid communication with the tire cavity. FIG. 5 further illustrates that first port 48 and second port 50 further include a directional one way valve 56, 58 to prevent backflow of tire cavity air into the pump. The directional one way valve 56, 58 may be a check valve. The directional one way valves 56, 58 also prevent flow from pump 41 to pump 42 and vice versa. This is critical to prevent short circuiting of the two pumps and ensure that the air is pumped into the tire cavity.

Figure 4:
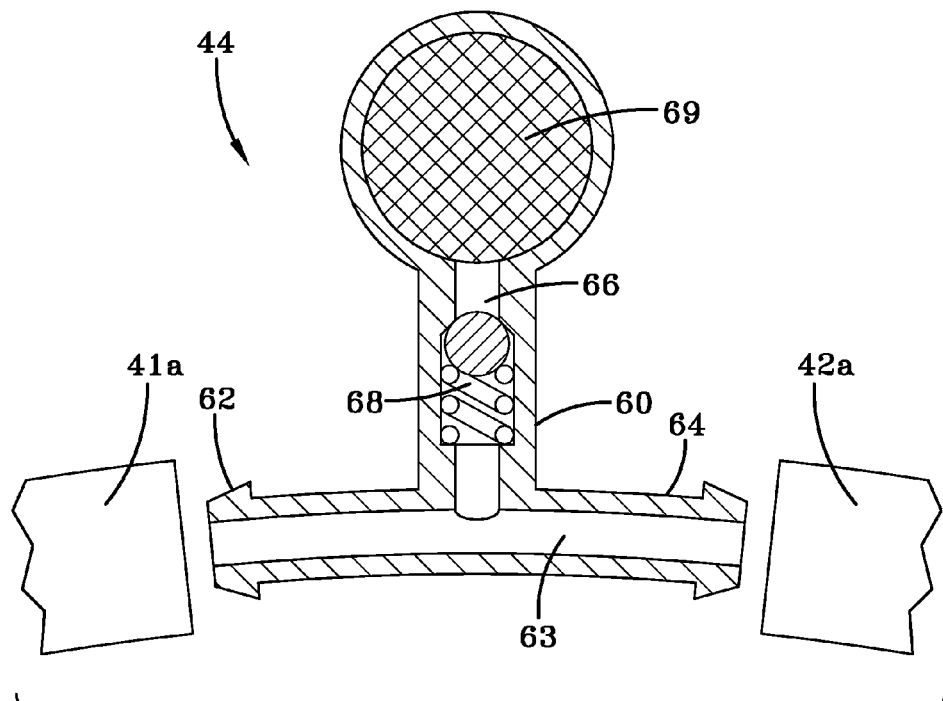
FIG. 4 is a front view of the inlet assembly.

A first embodiment of an inlet device 44 is shown in FIG. 4. The inlet device functions to regulate the inlet flow of both pumps 41, 42. The inlet device 44 includes a T shaped body 60 that may be molded into a green tire and then cured. The T shaped body has a first port 62 that connects to the inlet end 41a of pump 41. The T shaped body has a second port 64 that connects to the inlet end 42a of pump 42. The first port 62 and second port 64 are in fluid communication with each other with passageway 63. The T shaped body has an inlet passageway 66 that is in fluid communication with passageway 63, first port 62 and second port 64. The inlet passageway 66 has a one way valve 68 positioned in the passageway 66. The inlet passageway 66 is connected to an optional filter assembly 69 that houses a filter media. The inlet passageway 66 and the optional filter assembly 69 is in fluid communication with the outside air. The one way valve 68 prevents flow from either pump 41, 42 from exiting the inlet assembly through passageway 66 and then through the filter assembly 69.

Figure 6:
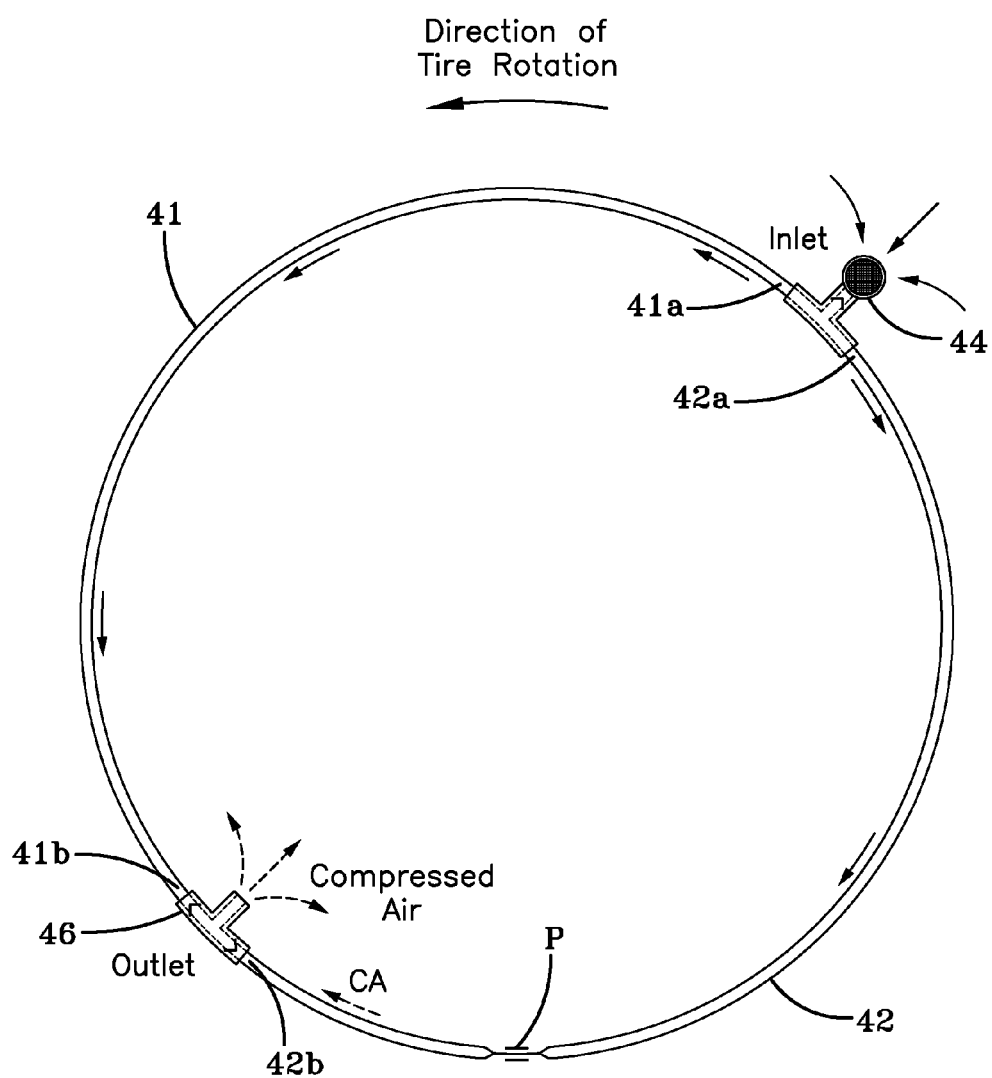
FIGS. 6 and 7 illustrate the hybrid pump operation when the tire rotates in the counterclockwise direction.
Figure 7:
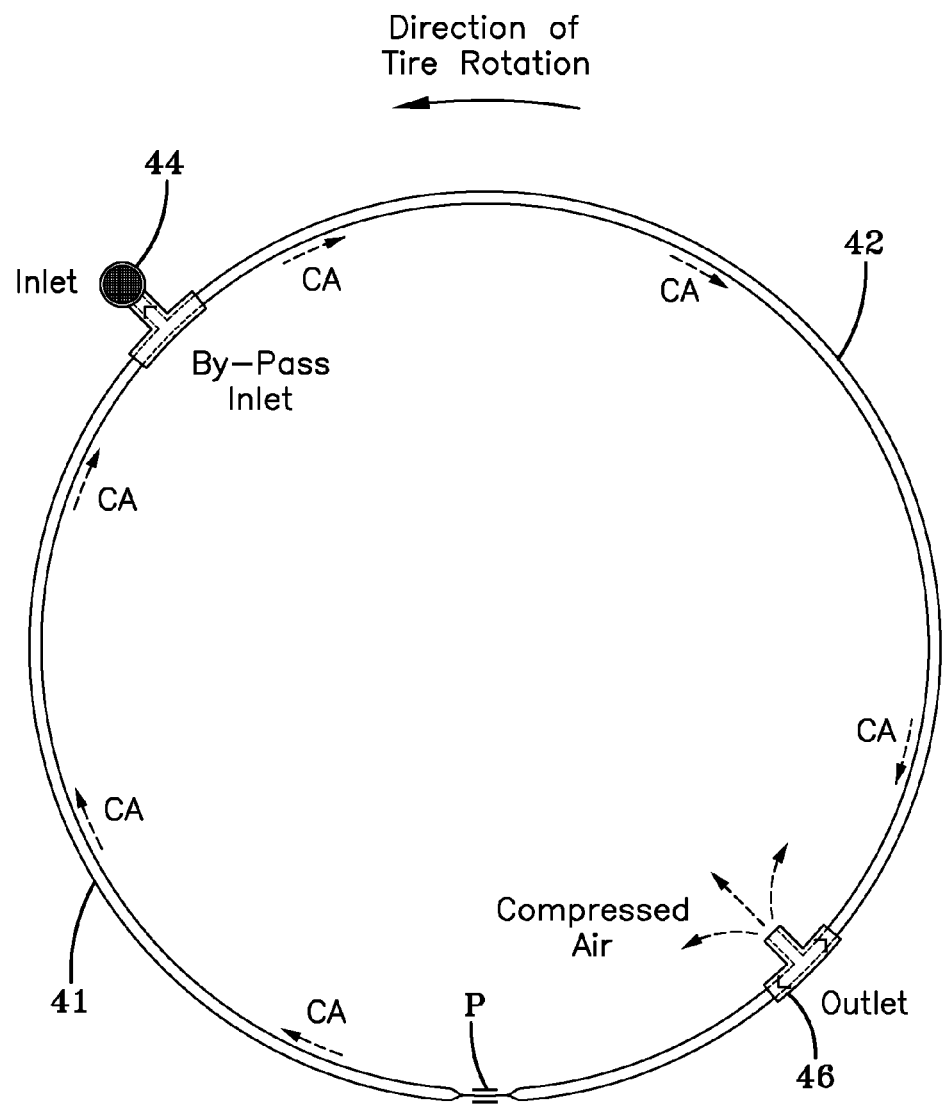
Figure 8:
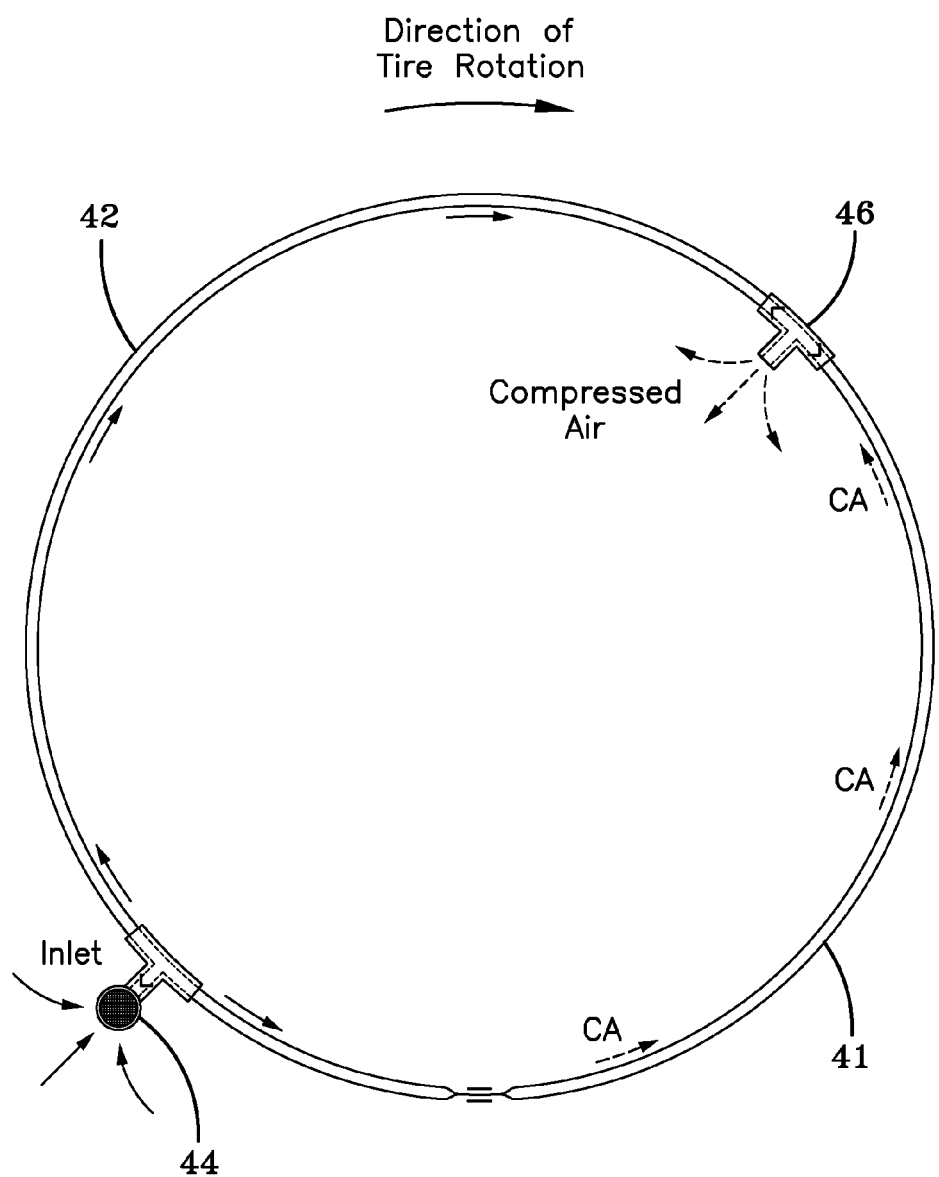
FIG. 8 illustrates the hybrid pump operation when the tire rotates in the clockwise direction.

FIGS. 6-8 illustrate the hybrid pump device during operation. The tire has been removed for clarity. FIG. 6 illustrates the direction of tire rotation as being counterclockwise. As the tire rotates counterclockwise, pump tube 42 is compressed at point P. As the tire rotates counterclockwise, compressed air in pump tube 42 is released into the tire cavity through outlet device 46. As shown in FIG. 7, when the tire pressure point P is located on pump 41, the compressed pump air is routed towards the inlet device 46. The inlet device 46 functions as connector to allow the compressed air to flow through passageway 63 which joins pump 41 to pump 42. The compressed air continues through pump 42 to outlet device 46 and then into the tire cavity 40. Thus the two separate pumps function as one. The one way valve 68 prevents pumped air from escaping the inlet control device 44.

The inlet device allows air to enter the inlet device 44 of the hybrid pump assembly when the inlet device 44 has rotated past the tire footprint, as shown in FIGS. 6 and 8. Thus the pumps 41, 42 will fill with air only during ½ a tire rotation, when the inlet has rotated past the footprint and prior to rotation past the outlet.

Thus as described above, the hybrid pump assembly of the invention functions as a 360 degree pump, thus allowing both 180 degree pumps 41, 42 to pump during rotation in either direction. Typically, when two 180 degree pumps are used for bi-directional pumping, only one pump is actually pumping. The pump not being used will pump when the tire is rotated in the opposite direction. The hybrid pump of the invention overcomes this disadvantage. The hybrid pump of the invention has a pumping rate equivalent to a 360 degree pump, because the inlet device connects the two 180 degree pumps together to transfer flow from one pump to the other as shown in FIG. 7. In addition, the hybrid pump can pump like a 360 degree pump if the tire rotates in either direction, as shown in FIGS. 6-8. The 360 degree hybrid pump of the invention allows for a greater pumping rate and a higher pressure to be reached when pumping, as compared to a 180 degree pump. This is really the main advantage of the hybrid design, it combines the best aspects from both approaches, the bi-directionality and the greater pumping capacity.

In one embodiment, the peristaltic pump assembly 14 is positioned in the tire sidewall. So positioned, the air tube 41, 42 is radially inward from the tire footprint 100 and is thus positioned to be flattened by forces directed from the tire footprint as described above. The segment that is opposite the footprint 100 will flatten from the compressive force from the footprint compressing the tube segment. Although the positioning of the pump tube 41, 42 is specifically shown as being located in the bead region of the tire, it is not limited to same, and may be located at any region of the tire undergoing a compressive force, such as anywhere in the sidewall or tread. The diametric sizing of the peristaltic pump air tube 41, 42 is selected to span the circumference of the rim flange surface 26, although it is not limited to same.

From the forgoing, it will be appreciated that the subject invention provides a bi-directionally peristaltic pump for a self-inflating tire in which a circular air tube flattens segment by segment and closes in the tire footprint. The air inlet T-device 44 may include a filter and be self-cleaning. The air inlet device 44 may be coupled to a pressure regulator, such as disclosed in US 20130048178 A1, which is hereby incorporated by reference. The peristaltic pump assembly 14 may be used with a secondary tire pressure monitoring system (TPMS) (not shown) of conventional configuration that serves as a system fault detector. The TPMS may be used to detect any fault in the self-inflation system of the tire assembly and alert the user of such a condition.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A self-inflating tire assembly comprising:
  a. a tire mounted to a rim, the tire having a tire cavity, first and second sidewalls extending respectively from first and second tire bead regions to a tire tread region;
  b. a first air tube mounted in the tire and defining an air passageway, the air tube being composed of a flexible material operative to allow a portion of the air tube segment near a tire footprint to close the passageway, the first air tube having an inlet and an outlet,
  c. a second air tube mounted in the tire and defining an air passageway, the air tube being composed of a flexible material operative to allow a portion of the air tube segment near a tire footprint to close the passageway, the second air tube having an inlet and an outlet,
  d. wherein the inlet of the first air tube is connected to the inlet of the second air tube by a T shaped body having a first port connected to the inlet end of the first air tube, and a second port connected to an inlet end of the second air tube, wherein the first port and the second port are joined together by a passageway, wherein the inlet device has an inlet in fluid communication with the outside air; wherein the T shaped body further includes a one way valve positioned between the inlet of the inlet device and each inlet of the first and second air tube;
  e. and wherein the outlet of the first air tube and the second air tube are joined together and each outlet is in fluid communication with the tire cavity;
  f. wherein the T shaped body further including a third port in fluid communication with the outside air, and wherein the third point is joined to the passageway, wherein the one way valve is positioned in the third port between the passageway and the outside air inlet.

2. The tire assembly of claim 1, wherein the first and second air tube is sequentially flattened by the tire footprint to pump air along the air passageway in either a forward tire direction of rotation or a reverse tire direction of rotation.

3. The tire assembly of claim 1, wherein the outlet device and the inlet device are about 180 degrees apart.

4. A self-inflating tire assembly comprising:
  a. a tire mounted to a rim, the tire having a tire cavity, first and second sidewalls extending respectively from first and second tire bead regions to a tire tread region;
  b. a first air tube mounted in the tire and defining an air passageway, the air tube being composed of a flexible material operative to allow a portion of the air tube segment near a tire footprint to close the passageway, the first air tube having an inlet and an outlet,
  c. a second air tube mounted in the tire and defining an air passageway, the air tube being composed of a flexible material operative to allow a portion of the air tube segment near a tire footprint to close the passageway, the second air tube having an inlet and an outlet,
  d. wherein the inlet of the first air tube is connected to the inlet of the second air tube by an inlet device, wherein the inlet device has an inlet in fluid communication with the outside air; wherein the inlet device is a T shaped body having a first port connected to the inlet end of the first air tube, a second port connected to an inlet end of the second air tube, and a third port in fluid communication with the outside air, wherein the first port and the second port are joined together by a passageway;
  e. wherein a one way valve is positioned in the third port between the passageway and the outside air inlet; and
  f. wherein the outlet of the first air tube and the second air tube is in fluid communication with the tire cavity.

* * * * *